(12) United States Patent
Quirk

(10) Patent No.: US 8,678,483 B2
(45) Date of Patent: Mar. 25, 2014

(54) WINDOW ASSEMBLY FOR AN AUTOMOBILE HOOD

(76) Inventor: Kevin Quirk, Stanhope, NJ (US)

(*) Notice: Subject to any disclaimer, the term of this patent is extended or adjusted under 35 U.S.C. 154(b) by 0 days.

(21) Appl. No.: 13/465,450

(22) Filed: May 7, 2012

(65) Prior Publication Data

US 2012/0280537 A1   Nov. 8, 2012

Related U.S. Application Data

(60) Provisional application No. 61/483,308, filed on May 6, 2011.

(51) Int. Cl.
*B62D 25/10* (2006.01)
*B60J 1/02* (2006.01)

(52) U.S. Cl.
USPC .................................. 296/193.11; 180/69.24

(58) Field of Classification Search
USPC ........................ 296/193.11, 145, 146.15, 215; 180/69.24; D12/173, 196
See application file for complete search history.

(56) References Cited

U.S. PATENT DOCUMENTS

| | | | |
|---|---|---|---|
| 2,386,151 A * | 10/1945 | Trautvetter | ..................... 52/208 |
| 3,776,591 A | 12/1973 | Krueger | |
| 4,153,291 A | 5/1979 | Conti | |
| 4,629,022 A | 12/1986 | Wayne | |
| 4,952,006 A | 8/1990 | Willey | |
| 4,953,909 A | 9/1990 | Crane | |
| 5,275,249 A | 1/1994 | Nelson | |
| 6,039,390 A * | 3/2000 | Agrawal et al. | ............... 296/211 |
| 6,062,629 A | 5/2000 | Gentile | |
| D517,459 S * | 3/2006 | Chan | ........................... D12/173 |
| 7,357,442 B1 * | 4/2008 | Drews | ........................ 296/180.1 |
| 7,765,970 B2 | 8/2010 | Sammons | |
| 7,862,107 B2 | 1/2011 | Oba | |

FOREIGN PATENT DOCUMENTS

JP       07125541 A       5/1995

* cited by examiner

*Primary Examiner* — Dennis Pedder
(74) *Attorney, Agent, or Firm* — Gearhart Law, LLC

(57) ABSTRACT

A window for an automobile hood, made of a transparent material, such as a polycarbonate sheet, sized and shaped to be a loose fit to an automobile hood cut-out. The window element may be held in place on the automobile by ring shaped, metallic trim elements. The trim elements may have outer edges that are an enlarged copy of the periphery the cut-out in the hood of the automobile and inner edges that are a reduced copy of the periphery the window element. In this way, the window element may be held in the cutout in the automobile hood, sandwiched between the upper and lower trim elements. By applying a suitable adhesive between the trim elements and the automobile hood, the trim and window elements may be fixed in place.

17 Claims, 4 Drawing Sheets

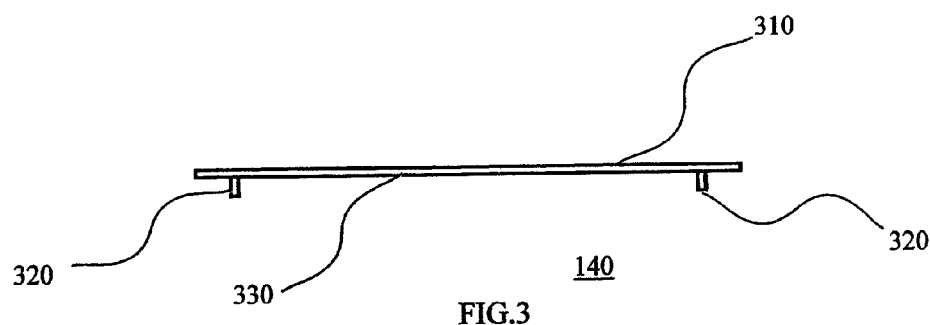
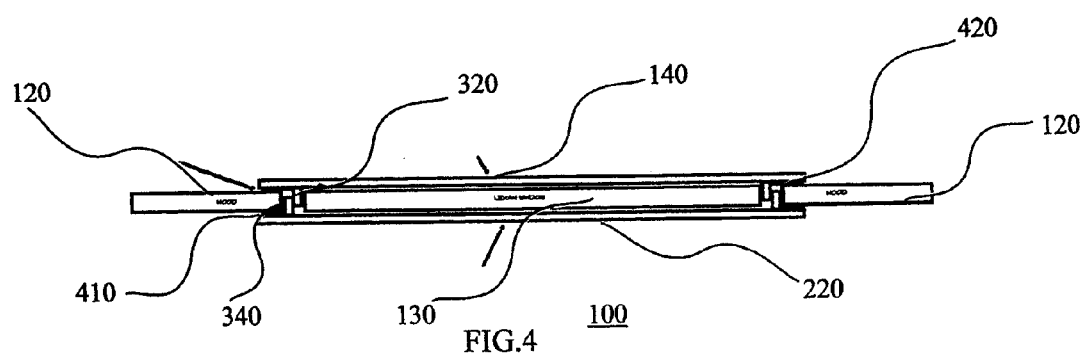
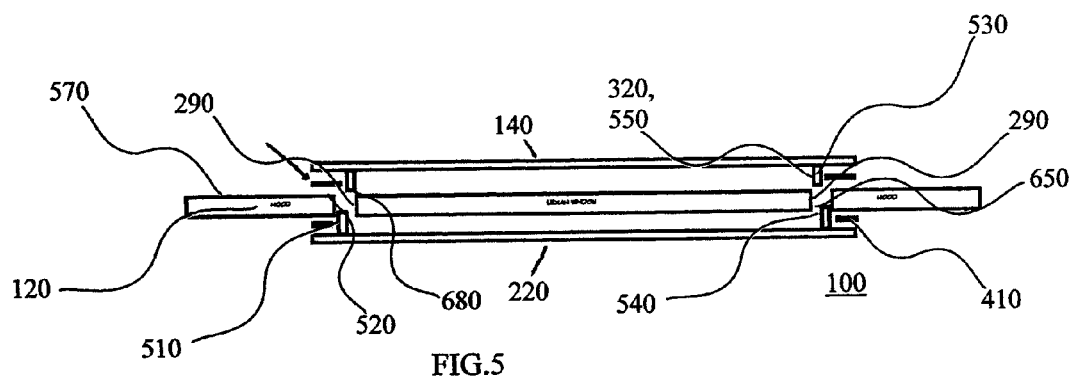
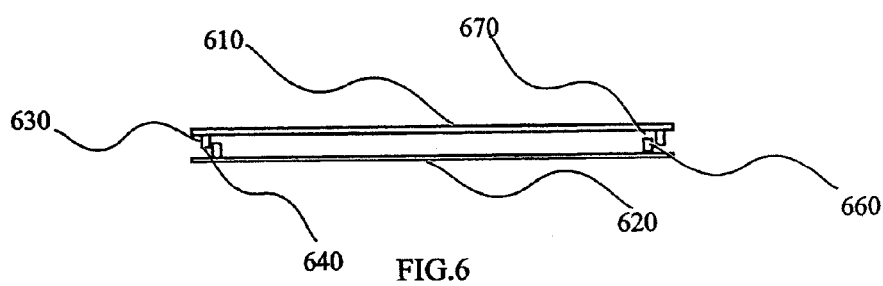

WINDOW ASSEMBLY FOR AN AUTOMOBILE HOOD

CLAIM OF PRIORITY

This application claims priority to U.S. Provisional Patent No. 61/483,308 entitled "Window Assembly For An Automobile Hood" filed on May 6, 2011, the contents of which are fully incorporated herein by reference

FIELD OF THE INVENTION

The invention relates to a window assembly for an automobile hood, and more particularly to rigid, see-through window made of a substantially transparent material that is sized and shaped to fit a cut-out in an automobile hood and held in place by separate upper and lower trim elements.

BACKGROUND OF THE INVENTION

In the field of custom cars, the aesthetics of the finished product, particularly the engine, are considered very important.

For instance, it is common practice to replace all the visible parts of the engine such as, but not limited to, the radiators, engine pulleys, water pumps, intake manifolds, headers, hood hinges, hoses, coils, oil pans, brake power boosters, thermostat housings, radiator fans, timing-chain covers, air-conditioning compressors, power-steering pumps and bolt covers with chrome or aluminum versions to enhance the appearance of the car.

Even the underneath of the hood is commonly decorated with a custom paint scheme or with mirrors that help display the engine when the hood is open.

The problem, however, is that when the car is being driven, the hood must be closed and all the custom engine work is hidden from view.

The present invention solves this problem by providing a transparent window on the automobile hood so that the engine is visible even when the hood is closed.

DESCRIPTION OF THE RELATED ART

The relevant art involving car hood windows and portals includes:

U.S. Pat. No. 4,153,291 issued to Conti et al. on May 8, 1979 entitled "Viewport assembly" that describes a view port assembly for installation in the hood of a vehicle, the hood having an opening cut therein adapted to receive the viewport assembly. The viewport assembly includes a viewport having a central portion and a peripheral portion, with the viewport being of a size larger than the hood opening so that the peripheral portion of the viewport overlaps the peripheral edge of the hood opening. The overlapping portion of the viewport is provided with a tapered edge for engaging the upper surface of the hood and for providing a smooth transition between the viewport and the hood. The viewport further includes a mounting member extending in a direction perpendicular to the viewport and extending from the viewport at a point between the peripheral and central portions thereof. The viewport assembly further includes lip means connected to the mounting member for engaging the underside of the hood to securely fasten the viewport within the hood opening. A number of alternative embodiments are disclosed in which the mounting member may be a snap-fit element, a U-shaped flange, or a clamp arrangement.

U.S. Pat. No. 3,776,591 issued to Krueger on Dec. 4, 1973 entitled "AUTOMOBILE OPERA WINDOW INSTALLATION APPARATUS AND METHOD" that describes a quarter panel and headliner of an automobile having openings cut therein, and the flange of a stepped outer ring is secured to the inner surface of the quarter panel. A flanged inner ring is inserted through the headliner opening and telescopes into the outer ring, adequate clearance being provided between the rings to allow for angular adjustments. The space between the telescoped rings is filled with adhesive, the vinyl roof on the automobile is secured in place within the outer ring, and a glass panel and a trim ring are installed in the step of the outer ring with adhesive to complete the installation.

U.S. Pat. No. 7,862,107 issued to Oba et al. on Jan. 4, 2011 entitled "Cover for vehicle" that describes an intake system cover for a vehicle is mounted in an engine compartment to cover a reservoir tank that stores coolant for an engine. The intake system cover for the vehicle is formed with a light introduction opening for introducing light to be directed toward a liquid level gauge at a side of the reservoir tank. The visibility of the liquid level of the reservoir tank at the liquid level gauge is improved.

Various implements are known in the art, but fail to address all of the problems solved by the invention described herein. One embodiment of this invention is illustrated in the accompanying drawings and will be described in more detail herein below.

SUMMARY OF THE INVENTION

The present invention relates to a solid, see-through window assembly for an automobile hood.

In a preferred embodiment, the solid, see-through window assembly may consist of a rigid, sheet of a substantially transparent material, sized and shaped to be a loose fit to an automobile hood cut-out. The window element may for instance be made of a suitably tough transparent material such as, but not limited to, a polycarbonate sheet.

The window element may be held in place on the automobile hood by upper and lower trim elements. In a preferred embodiment, the trim elements may, for instance, be made of a rigid ring cut from a metal sheet. The trim elements may have outer edges that are sized and shaped to be an enlarged copy of the periphery of the cut-out in the hood of the automobile. The inner edges of the trim elements may be sized and shaped to be a reduced copy of the periphery the window element. In this way, the window element may be held in place in alignment with the automobile hood, sandwiched between the upper and lower trim elements. By applying a suitable adhesive such as, but not limited to, double sided tape or epoxy resin, between the lower trim element and a lower surface of the automobile hood, and between the upper trim element and the upper surface of the automobile hood, the trim and window elements may be fixed in place.

Therefore, the present invention succeeds in conferring the following, and others not mentioned, desirable and useful benefits and objectives.

It is an object of the present invention to provide a transparent view port to the engine of an automobile.

It is another object of the present invention to provide a view port that is easy to install, and relatively inexpensive to manufacture.

Yet another object of the present invention is to provide a view port that may be custom made to match the contours of particular vehicles.

Still another object of the present invention is to provide a view port that is imperious to rain.

Still another object of the present invention is to provide a view port assembly that is aesthetically pleasing.

BRIEF DESCRIPTION OF THE DRAWINGS

FIG. 3 shows a cross-sectional view of an upper trim element of a preferred embodiment of the invention.

FIG. 4 shows a cross-sectional view of the solid, see-through window assembly of a preferred embodiment of the present invention.

FIG. 5 shows an exploded cross-sectional view of the solid, see-through window assembly of a preferred embodiment of the present invention.

FIG. 6 shows a cross-sectional view of an upper and a lower trim alignment bar intended for aligning the solid, see-through window assembly of the present invention.

DESCRIPTION OF THE PREFERRED EMBODIMENTS

Figure 1:
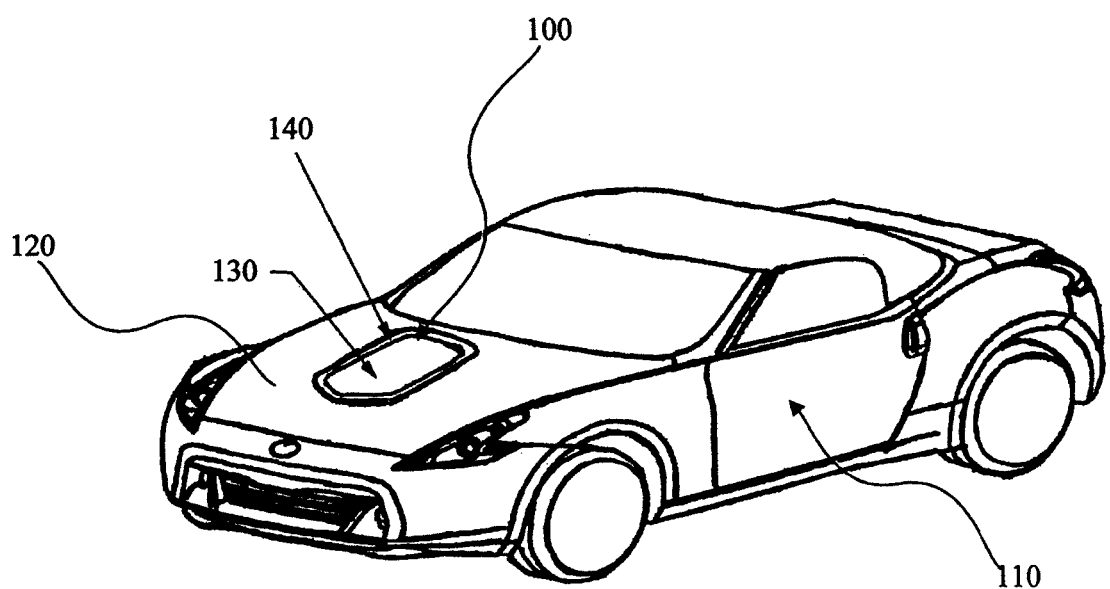
FIG. 1 shows an isometric view of a solid, see-through window assembly of the present invention installed in an automobile.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows an isometric view of a solid, see-through window assembly of the present invention installed in an automobile 110. The solid, see-through window assembly 100, as seen in use in FIG. 1, includes a window element 130 held in place on an automobile hood 120, in part, by an upper trim element 140.

The window element 130 may, for instance, be a rigid sheet of a substantially transparent material, such as, but not limited to, a polycarbonate sheet or a layered polycarbonate sheet. In a preferred embodiment, the window element 130 may be sized and shaped to be a loose fit to the automobile hood cut-out 210 (shown in FIG. 2).

The upper trim element 140 may, for instance, be a rigid, ring that may, for instance, be laser cut from a sheet of 20 gauge steel. In a preferred embodiment, the upper trim element 140 may be chrome plated.

Although FIG. 1 shows an automobile with one window element in one automobile hood cut-out, there may be multiple window elements in multiple automobile hood cut-outs on the same automobile hood. For instance, there may be a relatively large window element in the center of the automobile hood, with two smaller window elements flanking it, one on each side. The window elements could be made from differing materials. The larger window element may be made of glass or Plexiglas, for example, while the two smaller window elements flanking it are made from mesh. The mesh may be any porosity or material, including mesh made from materials including but not limited to, metals, resins, plastics, rubbers, textiles, or any combination of materials.

Alternately, there may be a rectangular window element near the front of the automobile hood and smaller window elements in the automobile hood that are closer to the windshield of the automobile. One or more of the smaller window elements may be made of mesh, while others are made of glass or Plexiglas or other materials, and the larger window element is made of tinted glass.

Although the automobile shown is a car, the invention may be disposed in any type of automobile, including but not limited to, a truck, a van, an SUV, farm equipment, or any desired automobile.

Figure 2:
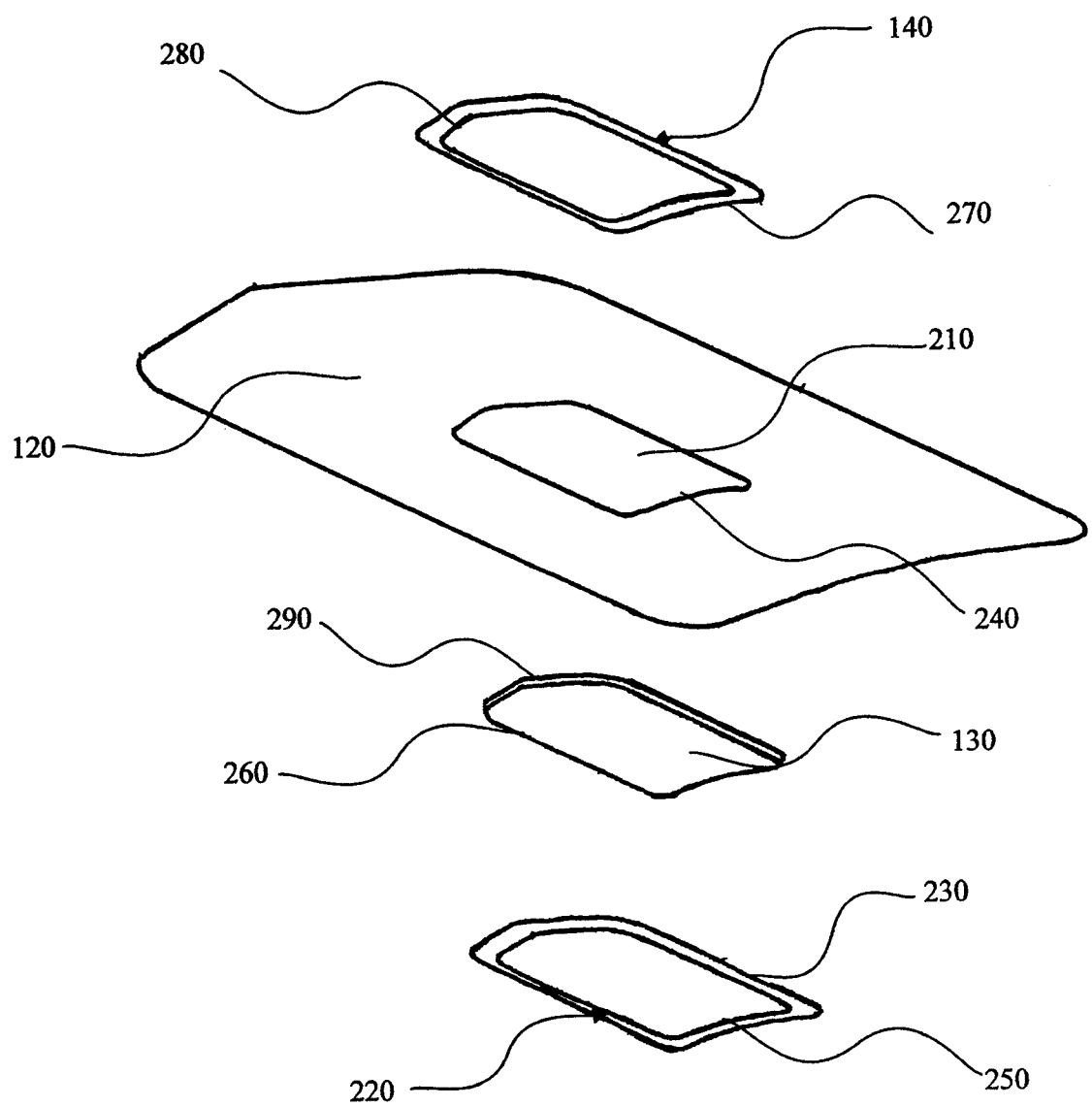
FIG. 2 shows an exploded isometric view of the solid, see-through window assembly of the present invention in relation to an automobile hood.

FIG. 2 shows an exploded isometric view of the solid, see-through window assembly of the present invention in relation to an automobile hood showing the automobile hood 120 with the automobile hood cut-out 210, the window element 130 and the upper and lower trim element 140, 220 that may be used to secure the window element 130 within the automobile hood cut-out 210.

As shown in FIG. 2, both the upper and lower trim elements 140, 220 may be rigid rings having outer edges 270, 230 that may be sized and shaped to be an enlarged copy of the periphery 240 of the automobile hood cut-out. Similarly, both the upper and lower trim elements 140, 220 may have inner edges 280, 250 that may be sized and shaped to be a reduced copy of the periphery 260 of the window element 130, such that the outer edge 290 of the window element 130 fits into the periphery 240 of the automobile hood cut-out.

The upper and lower trim elements 140, 220 may both be made of a suitable metal sheet material such as, but not limited to, aluminum sheet, stainless steel sheet, galvanized steel sheet, or some combination thereof. In a preferred embodiment, both the upper and lower trim elements 140, 220 may be made of 20 gauge sheet steel. The trim elements 140, 220 may be esthetically enhanced using, for instance, coating or patterning techniques such as, but not limited to, chrome plating, anodizing, enameling, painting, or some combination thereof.

In a preferred embodiment, both the upper and lower trim elements 140, 220 and the window element 130 may be contoured to be a close match to the contour of the automobile hood 120 in the relevant vicinity of the automobile hood cut-out 210. The window element 130 may also be shaped, in whole, or in part, to act as a lens, or magnifying element, to provide an enlarged view of a portion, or of all, of the mechanical components exposed to view.

The window element 130 may be made of any suitably transparent material such as, but not limited to, sheets of glass, acrylic, polycarbonate, laminated sheets of polycarbonate, or some combination thereof. In a preferred embodiment, the window element 130 may be made of a polycarbonate sheet of the grade and quality sold under the trade name of Lexan®, a registered trade mark of the Saudi Basic Industries Corporation of Riyadh, Saudi Arabia.

The window element 130 may be tinted for esthetic effect, or may be coated with suitable anti-reflection coatings or antiglare coatings.

FIG. 3 shows a cross-section view of an upper trim element of a preferred embodiment of the invention. The upper trim element 140 may be a rigid ring 310 and may have a ridge 320 that may be fixed on the lower surface 330 of the upper trim element 140. This ridge 320 of the upper trim element may be used to help secure the window element 130 as discussed in more detail in FIGS. 4 and 5.

FIG. 4 shows a cross-section view of the solid, see-through window assembly of a preferred embodiment of the present invention.

As shown in FIG. 4, the lower trim element 220 may be attached to the automobile hood 120 by an adhesive 410 that may be located between the lower trim element 220 and a lower surface of the automobile hood 120. Similarly, the upper trim element 140 may be attached to the automobile hood 120 by a second adhesive 420 disposed between the upper trim element 140 and an upper surface of the automobile hood 120.

The adhesive 410 and second adhesive 420 may be any suitable adhesive such as, but not limited to, a double-sided, pressure sensitive adhesive tape, an epoxy resin mixture or some combination thereof.

In this way the window element 130 may be sandwiched between the lower trim element 220 and the upper trim element 140 and held in place in the plane of the automobile hood 120.

FIG. 4 also shows how the ridge 320 of the upper trim element may be nested inside the ridge 340 of the lower trim element to further help secure the window element 130 in place.

In an alternate embodiment, the upper and lower trim elements 140, 220 may be held in place using fastening elements such as, but not limited to, rivets, nut and bolt combinations, split pins or some combination thereof.

In an alternate embodiment, there may a gasket between either the upper or lower trim elements 140, 220 and the automobile hood 120. Such a gasket may, for instance, form a more water tight seal or reduce vibration between the trim elements and the automobile hood 120. Such a gasket may be made from any suitable material such as, but not limited to, leather, cloth, plastic, wood, rubber or some combination thereof.

FIG. 5 shows an exploded cross-sectional view of the solid, see-through window assembly of a preferred embodiment of the present invention. Shown in FIG. 5 is the solid, see-through window assembly 100, the automobile hood 120, the upper trim element 140, the lower trim element 220, the outer edge 290 of the window element, the ridge 320 of the upper trim element, the adhesive 410 disposed between the lower trim element and a lower surface of the automobile hood, outer edge 510 of the lower trim element ridge, inner edge 520 of the automobile hood cut-out, outer edge 530 of the upper trim element ridge, the inner edge 540 at the lower trim ridge, the inner edge 550 of the upper trim element ridge, the upper surface 570 of the automobile hood 120, the upper surface 650 of the ridge of the lower trim element, and the lower surface 680 of the ridge of the upper trim element.

This exploded view shows that when the lower trim element 220 is fitted to the automobile hood 120, an outer edge 510 of the ridge of the lower trim element 220 may fit in close proximity to an inner edge 520 of the automobile hood cut-out 210.

When the upper trim element 140 is then fitted to the automobile hood 120, the outer edge 530 of the ridge 320 of the upper trim element may fits in close proximity to an inner edge 540 of the lower trim ridge, while an inner edge 550 of the ridge 320 of the upper trim element 140 may fit in close proximity to an outer edge 290 of the window element 130. In this way, the window element 130 may be securely sandwiched between the upper and lower trim elements, in alignment with the automobile hood.

FIG. 6 shows a cross-section view of an upper and a lower trim alignment bar intended for aligning the solid, see-through window assembly of the present invention.

The lower trim alignment bar 610 may have a lower alignment bar ridge 630 attached to it. The lower surface 640 of the lower alignment bar ridge 630 may be sized and positioned to match the upper surface 650 of the ridge of the lower trim element 220. In this way, the lower trim alignment bar 610 may be used to ensure that the lower trim element 220 is correctly sized and positioned.

Similarly, the upper trim alignment bar 620 may have an upper alignment bar ridge 660 attached to it. The upper surface 670 of the upper alignment bar ridge 660 may be sized and positioned to match the lower surface 680 of the ridge of the upper trim element 140. In this way, the upper trim alignment bar 620 may be used to ensure that the upper trim element 140 is correctly sized and positioned.

Figure 7:
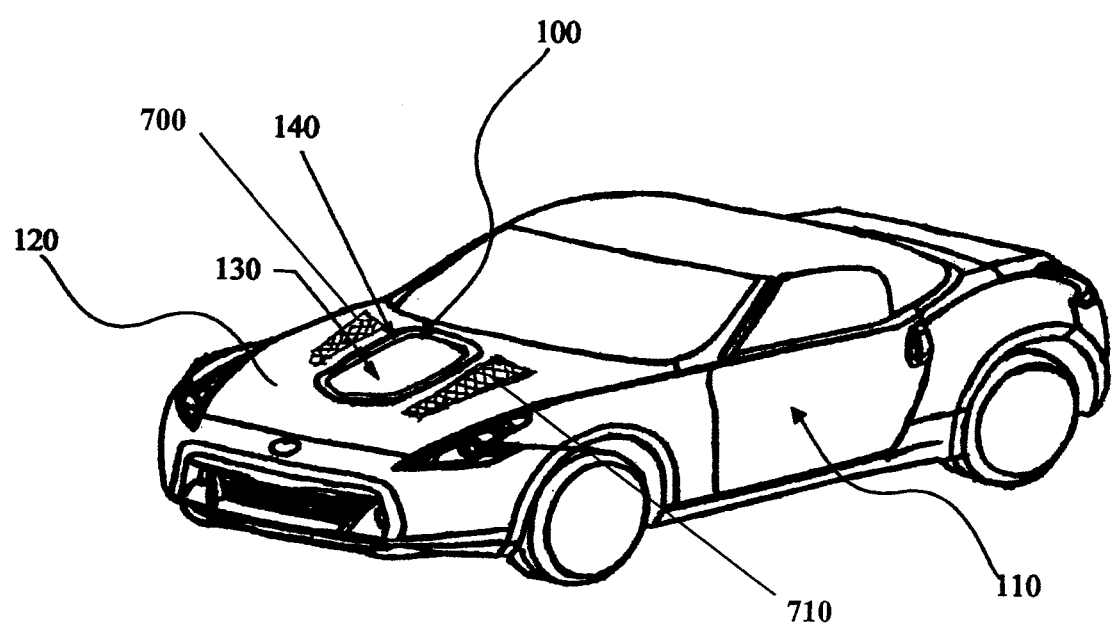
FIG. 7 shows an isometric view of three solid, see-through window assemblies of the present invention installed in an automobile.

FIG. 7 shows an isometric view of three solid, see-through window assemblies of the present invention installed in an automobile. FIG. 7 shows a solid, see-through window assembly 100, an automobile 110, an automobile hood 120, a window element 130, an upper trim element 140, a left window element 700, and a right window element 710. The left and right window elements are made of mesh and are a different shape, but are otherwise comprised of the elements of the solid, see-through window assembly 100, including the trim elements. The preferred material for the left and right window elements is stainless steel mesh, but may be any material as stated with FIG. 1. There may be a solid cover for the window elements that are composed of mesh, such that the cover fits inside the frame opening and over the window element, and is secured by fasteners, preferably butterfly screws.

The solid, see-through window assembly may be retrofitted to an existing automobile hood, or a hood may be manufactured with the invention in place. For instance, the hood of an existing automobile may have a portion cut out and have the window element and trim elements installed. Alternately, a car hood manufacturer may manufacture car hoods with the see-through window assembly in place.

Although the figures depict the see-through window assembly with a specific shape of window element, the window element and corresponding features may be any shape, including but not limited to, rectangular, chevron, circular, triangular, square, or any desired shape. The window element is preferably clear, but may be colored or tinted, for instance, it may be tinted black, although any color and level of tint may be used.

The see-through window assembly is preferably disposed on the automobile hood, but it may be disposed anywhere on the automobile, for instance, on the side fenders.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. At least one solid, see-through window assembly for an automobile hood, comprising:
   a window element comprised of a rigid sheet of a substantially transparent material, sized and shaped to be a loose fit to an automobile hood cut-out;
   a lower trim element comprised of a rigid ring of a second material, having an outer edge sized and shaped to substantially be an enlarged copy of a periphery of said automobile hood cut-out, and an inner edge sized and shaped to substantially be a reduced copy of a periphery of said window element, and having a ridge fixedly disposed on an upper surface, said upper surface having an adhesive disposed thereof, such that, when fitted to said automobile hood, an outer edge of said ridge fits in close proximity to at least a portion of an inner edge of said automobile hood cut-out; and an upper trim element comprised of a rigid ring of said second material, having an outer edge sized and shaped to substantially be an enlarged copy of said periphery of said automobile cut-out, and an inner edge sized and shaped to substantially be a reduced copy of said periphery of said window element, and having a ridge fixedly disposed on a lower surface, said lower surface having an adhesive disposed thereof, such that, when fitted to said automobile hood, an outer edge of said ridge fits in close proximity to an inner edge of at least a portion of said lower trim ridge, and an inner edge of said ridge fits in close proximity to an outer edge of said window element, thereby sandwiching said window element between said upper and lower trim elements, substantially in alignment with said automobile hood.

2. The assembly of claim 1 wherein said adhesive is disposed on said lower surface of said upper trim element and on said upper surface of said lower trim element and said lower surface and said upper surface are fixedly attached to automobile hood.

3. The assembly of claim 2 wherein said adhesive is double-side adhesive tape.

4. The assembly of claim 2 wherein said adhesive is an epoxy resin.

5. The assembly of claim 1 wherein said substantially transparent material is a polycarbonate sheet.

6. The assembly of claim 1 wherein said substantially transparent material is a layered polycarbonate sheet.

7. The assembly of claim 1 wherein said second material is a metal.

8. The assembly of claim 1 wherein said second material is 20 gauge sheet steel.

9. The assembly of claim 1 wherein said window element and said trim elements are bent to conform to a shape of said automobile hood.

10. The assembly of claim 1 wherein said substantially transparent material is tinted.

11. The assembly of claim 5 wherein said polycarbonate sheet further comprises an anti-reflection coating.

12. The assembly of claim 1 wherein said window element is mesh.

13. The assembly of claim 1 wherein said window element is a transparent material.

14. The assembly of claim 1 wherein there are two window elements and two automobile hood cut outs in a single automobile hood.

15. The assembly of claim 1 wherein there are three window elements and three automobile hood cut outs in single automobile hood.

16. The assembly of claim 14 wherein one of the window elements is mesh.

17. The assembly of claim 15 wherein at least one of the window elements is mesh.

* * * * *